US011483078B1

United States Patent
Sadek

(10) Patent No.: US 11,483,078 B1
(45) Date of Patent: Oct. 25, 2022

(54) METHOD AND RELATED SYSTEMS FOR COMMUNICATION VIA EXTREMELY LOW AND ULTRA LOW FREQUENCY ELECTROMAGNETIC WAVES

(71) Applicant: AlaaEldin Adel Mohamed Mahmoud Sadek, Amsterdam (NL)

(72) Inventor: AlaaEldin Adel Mohamed Mahmoud Sadek, Amsterdam (NL)

( * ) Notice: Subject to any disclaimer, the term of this patent is extended or adjusted under 35 U.S.C. 154(b) by 0 days.

(21) Appl. No.: 17/828,062

(22) Filed: May 31, 2022

(51) Int. Cl.
H04B 13/02 (2006.01)
H04B 14/04 (2006.01)

(52) U.S. Cl.
CPC ........... H04B 13/02 (2013.01); H04B 14/042 (2013.01)

(58) Field of Classification Search
CPC .... H04B 13/02; H04B 14/042; H04B 5/0031; H04B 5/0075; H04B 5/0081; H04B 5/02; H04B 5/0043; H04B 5/00; H04B 5/0062; H04L 27/04; H04L 67/12; H04L 25/05; H04L 25/0266; H04L 12/40006; H04L 67/04; G01R 33/00; G01R 33/482; G01R 33/032; G01R 33/0322; H04W 4/18; H04W 4/80; H04W 28/06
See application file for complete search history.

(56) References Cited

U.S. PATENT DOCUMENTS

| | | | | |
|---|---|---|---|---|
| 8,238,824 | B2 * | 8/2012 | Washiro | H01P 5/085 343/858 |
| 8,709,872 | B2 * | 4/2014 | Rofougaran | H01Q 9/065 438/109 |
| 9,178,369 | B2 * | 11/2015 | Partovi | H01F 38/14 |
| 9,564,977 | B2 * | 2/2017 | Roper | H04B 13/02 |
| 10,037,841 | B2 * | 7/2018 | Suzara | H01F 6/06 |
| 10,439,290 | B2 * | 10/2019 | Adriazola | H01Q 1/2291 |
| 2006/0041795 | A1 * | 2/2006 | Gabelmann | E21B 47/125 714/699 |
| 2010/0015918 | A1 * | 1/2010 | Liu | H04B 5/00 455/41.1 |
| 2021/0351814 | A1 * | 11/2021 | Cobler | H04B 5/0056 |

FOREIGN PATENT DOCUMENTS

WO WO-2020053732 A1 * 3/2020 ............. F03B 13/00

* cited by examiner

*Primary Examiner* — Lana N Le

(57) ABSTRACT

The present disclosure provides a method for long range communication through underwater and underground environments by converting encoded message data into spherical coordinates and rotating a magnet about axes of rotation corresponding to those spherical coordinates at a transmitter. A receiver configured to detect the magnetic dipole field of the generated electromagnetic wave can thus determine the orientation of the magnetic dipole, deduce the spherical coordinates, and decipher the encoded data. A system comprising a mechanical antenna transmitter and receiver with a magnetic field sensor arrangement for carrying out the method is also provided.

19 Claims, 2 Drawing Sheets

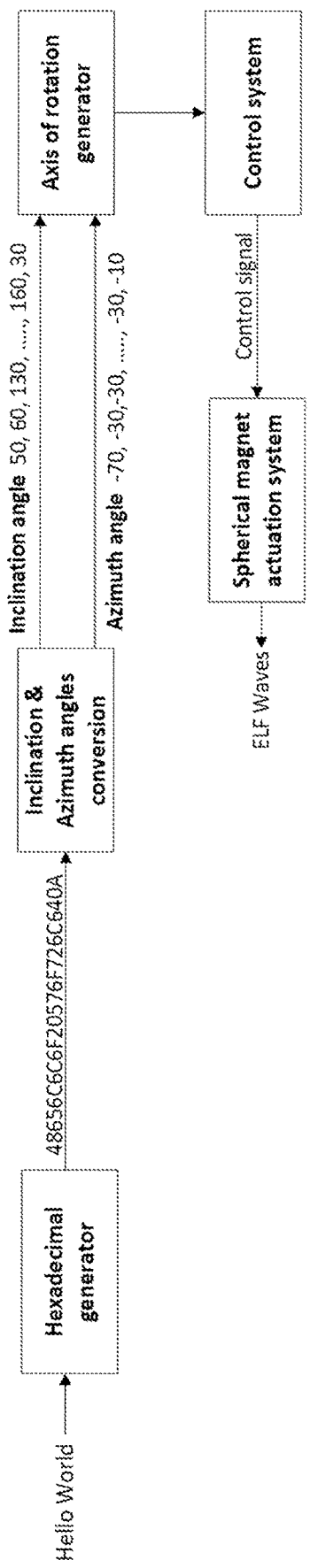
FIG. 3
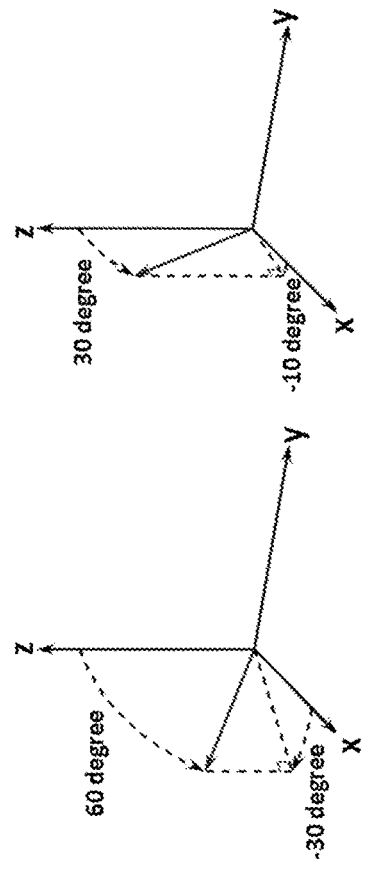
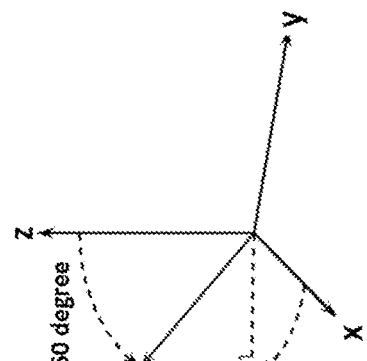
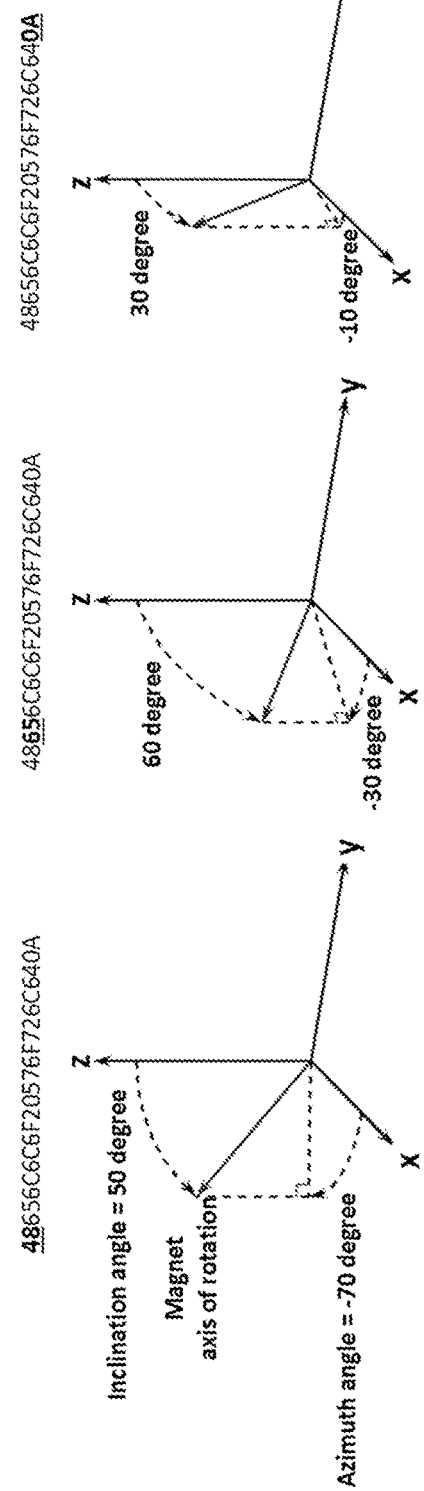
FIG. 4A  FIG. 4B  FIG. 4C

METHOD AND RELATED SYSTEMS FOR COMMUNICATION VIA EXTREMELY LOW AND ULTRA LOW FREQUENCY ELECTROMAGNETIC WAVES

FIELD OF INVENTION

The present invention relates generally to a method for communication and systems for carrying out the method. More specifically, the present invention relates to a method of generating an EM wave using a rotating magnet and encoding information into the wave by varying the axis of rotation.

BACKGROUND

In environments such as sea water and underground mines, high-frequency electromagnetic waves are severely limited in the distances over which they can effectively communicate information due to their high attenuation in through conductive mediums. Long range communications in such environments are often vital, so alternatives are needed.

Extremely low frequency (ELF) and ultra-low frequency (ULF) waves have a very low attenuation in the same environments due to their very large wavelengths, often spanning thousands of Kilometers. These types of waves are thus much more reliable for underwater and underground environment communications.

There are two main methods for generating the ELF/ULF waves. The first method is achieved using an electrical antenna, and requires a very large sized antenna due to the Chu-Harrington limit of traditional antenna radiation. The size of antenna required is of a scale which makes the generation of such waves impractical in most situations.

The second method is achieved using a rotating permanent magnet to generate ELF/ULF waves. The method was discovered by DARPA in 2016. This mechanical antenna arrangement has a small size and a much lower power consumption compared with the traditional antenna type.

The concept has been investigated in the prior art, and various designs and modulation techniques have been developed, however the rate of data transmission has remained inconveniently low. The modulation techniques explored so far have been limited to switching on/off the rotation of the magnet, changing the rotational speed of the magnet, or varying some type of external impedance using shields surrounding the magnet, all of which lead to a limit in the data transfer rate of a few bits/second.

Increasing the data transfer rate by using different magnetic configurations or using more efficient modulation techniques would make this kind of technology more efficient in practical situations. It is within this context that the present invention is provided.

SUMMARY

The present disclosure provides a method for long range communication through underwater and underground environments by converting encoded message data into spherical coordinates and rotating a magnet about axes of rotation corresponding to those spherical coordinates at a transmitter. A receiver configured to detect the magnetic dipole field of the generated electromagnetic wave can thus determine the orientation of the magnetic dipole, deduce the spherical coordinates, and decipher the encoded data. A system comprising a mechanical antenna transmitter and receiver with a magnetic field sensor arrangement for carrying out the method is also provided.

Thus, according to one aspect of the present disclosure there is provided a method of communication via low frequency electromagnetic waves, the method comprising the following steps.

(a) At a transmitter: receiving message data to be transmitted; encoding the message data using a pre-defined encoding method; dividing the encoded message data into one or more encoded data packets; converting each encoded data packet into a spherical unit vector co-ordinate having an inclination angle and an azimuthal angle within a range representing the encoded data packet; and for each encoded data packet, generating a low frequency wave by rotating a magnet or electromagnet, or rotating a magnetic field of a set of electromagnets, about an axis of rotation corresponding to the respective spherical unit vector coordinates for that data packet, the axis of rotation of the magnet, electromagnet, or electromagnetic field generated by the set of electromagnets, acting to modulate the magnetic field of the wave.

(b) At a receiver: receiving the low frequency wave; determining the axis of rotation of the magnetic field of the wave for each data packet by analyzing a magnetic dipole field of the wave; converting the spherical coordinates for the axis of rotation into the encoded data packets; and decoding and reconstructing the message data using the pre-defined encoding method.

In some embodiments, the pre-defined encoding method selected determines the azimuthal and inclination angle ranges associated with respective states representing the encoded data packets.

The azimuthal angle ranges and inclination angle ranges may be divided into equal portions, each representing an encoded data state. In such embodiments, each state may represent a respective alphanumeric character, symbol, command, or sequence thereof. For example, the pre-defined encoding system may be the Hexadecimal system. In such embodiments, each state on may convey an 8-bit or 16-bit data packet.

In some embodiments, the method further comprises carrying out the steps of (a) using multiple rotating magnets to convey multiple data packets in parallel, and wherein the waves from each rotating magnet are received and decoded at the same receiver, which comprises corresponding magnetic field sensors, loops, or coils for each transmitting magnet.

In some embodiments, the method further comprises controlling the speed of rotation of the magnet or electromagnet to encode the low frequency wave generated with additional information from the message data.

According to another aspect of the present disclosure, there is provided a system for carrying out the methods outlined above, the system comprising: a transmitter comprising: an encoding module configured to encode received message data, convert the encoded message data into one or more unit vector spherical coordinates, and output a control signal comprising the spherical coordinates; and a low frequency electromagnetic wave generator comprising a magnet or an electromagnet and an actuator arrangement coupled to the encoding module and configured to receive the control signal and rotate the magnet or electromagnet about an axis of rotation corresponding to the spherical coordinates contained in the control signal.

The system further comprises a receiver comprising: a magnetic field sensing arrangement configured to detect a low frequency electromagnetic wave and determine the orientation of the magnetic dipole field of the electromagnetic wave; and a decoder module coupled to the magnetic field sensing arrangement and configured to determine one or more spherical coordinates from the orientation of the electromagnetic dipole field, and decode the spherical coordinates into the message data.

In some embodiments, the magnetic field sensing arrangement of the receiver comprises at least two three-dimensional magnetic field sensors, current loops, or coils.

In some embodiments, the magnet is a permanent magnet, an electromagnet, or a combination of the two.

In some embodiments, the magnet is spherical. In other embodiments, the magnet is non-spherical and is embedded in a spherical shell.

In some embodiments, the system comprises multiple pairs of encoding modules and rotating magnets, each being configured to transmit encoded message data to the receiver in parallel.

In some embodiments, the actuator arrangement is mechanical, comprising one or more motors mechanically connected to and configured to rotate the magnet. In other embodiments, the actuator arrangement is electrical, comprising an air bearing mechanism configured to rotate the magnet or a magnetic levitation mechanism configured to rotate the magnet. In yet further embodiments, the actuator arrangement is fluidic.

BRIEF DESCRIPTION OF THE DRAWINGS

Various embodiments of the invention are disclosed in the following detailed description and accompanying drawings.

FIG. 3 illustrates an example data flow of a message communication transmitted according to the disclosed method.

FIG. 4A, FIG. 4B, and FIG. 4C illustrate respective portions of the encoded message of FIG. 3 represented in spherical coordinates.

Figure 1:
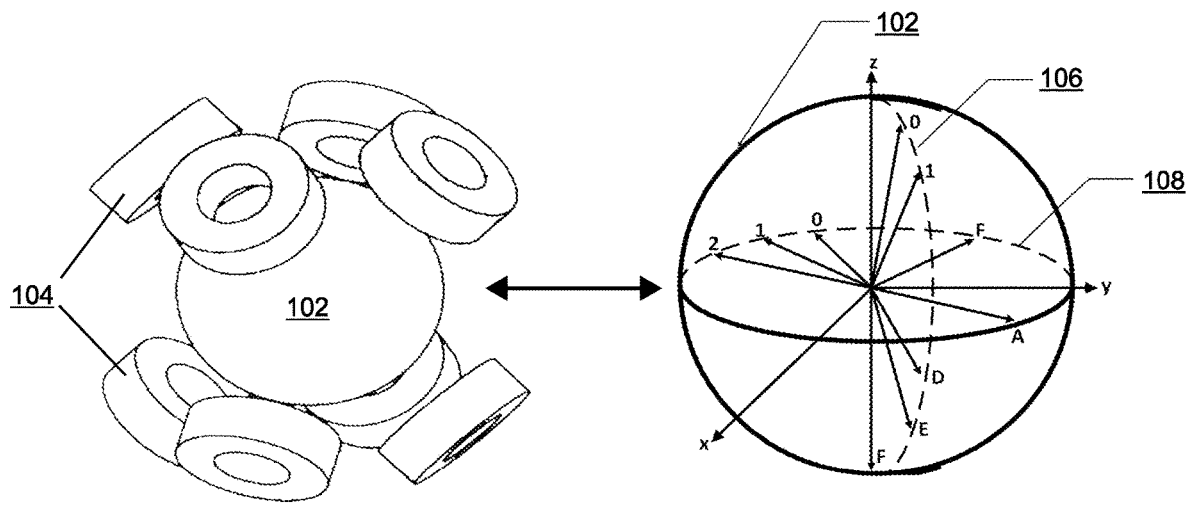
FIG. 1 illustrates an example configuration of a magnetic field generator of a transmitter of the disclosed system, and how spherical coordinates representing encoded data can be mapped to axes of rotation of the transmitter's rotating magnet.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

With reference to FIG. 1, an example configuration of a magnetic field generator is shown, the magnetic field generator of the present example comprising a spherical permanent magnet 102 suspended between two sets of electrical actuators 104.

The magnet 102 may also be an electromagnet, and may also take on other shapes capable of rotating within the space between actuators 104, for example the permanent magnet may be non-spherical but embedded in a spherical shell. The magnetic field generation source may also be a combination of both permanent magnets and electromagnetic components.

Electrical actuators 104 like electromagnetic coils may make use of either magnetic levitation techniques, an air bearing mechanism, or any other suitable mechanism which would allow for the magnet suspended between them to be freely rotated about an axis corresponding to any spherical co-ordinate originating from a central point of the magnet. The electrical actuators shown are also interchangeable with various mechanical actuator arrangements involving motorised wheels in direct contact with the magnet 102. The exact mechanisms by which the actuators 104 operate are not a central focus of the present application, but some examples of suitable mechanisms are provided in Micheal, Mina M., et al. "2D Magnetic Actuation and Localization of a Surface Milli-Roller in Low Reynolds Numbers." IEEE Robotics; Automation Letters 7.2 (2022): 3874-3881 and in Hamer, Tyler T., et al. "A MAGNETICALLY SUSPENDED, SPHERICAL PERMANENT MAGNETIC DIPOLE ACTUATOR." (2018); and S. E. Wright, A. W. Mahoney, K. M. Popek, and J. J. Abbott, "The Spherical-Actuator-Magnet Manipulator: A Permanent-Magnet Robotic End-Effector," IEEE Trans. Robotics, 33(5), 1013-1024 (2017).

On the right side of FIG. 1 a diagram of a spherical unit vector map is shown corresponding to the magnet 102. The axis about which the magnet 102 rotates can be represented by coordinates for spherical unit vector, which only requires two angles to represent—an inclination angle 106 in the range of 0-180 degrees and defined with respect to the Z axis and an azimuthal angle 108 in the range of 0-360 degrees, defining orientation on the X-Y plane.

Depending on the encoding system being used for communication (i.e. Hexadecimal 8-bit or Hexadecimal 16-bit) the range of inclination and azimuthal angles can be divided into an appropriate number of angle ranges, with each combination of inclination angle range and azimuthal angle range representing an encoded "state". For example, if the azimuth and inclination angles are divided by 1.32 and 0.66-degree steps respectively, the possible combination of these ranges gives 73712 different states, which can represent 16-bits of data in a single axis of rotation using the Hexadecimal system.

The rotation of the magnet can start around any arbitrary axis of rotation, which would be defined as the Z-axis of rotation for defining subsequent axes of rotation.

Although not illustrated, the magnet 102 and actuator 104 arrangement may in some cases also comprise friction dissipating mechanisms.

Figure 2A:
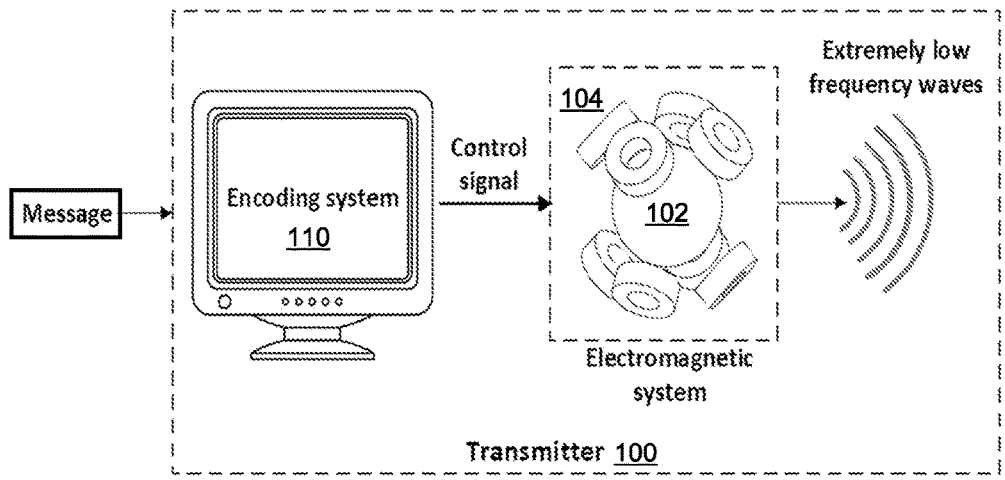
FIG. 2A illustrates a schematic of a message being generated and transmitted according to the disclosed method.
Figure 2B:
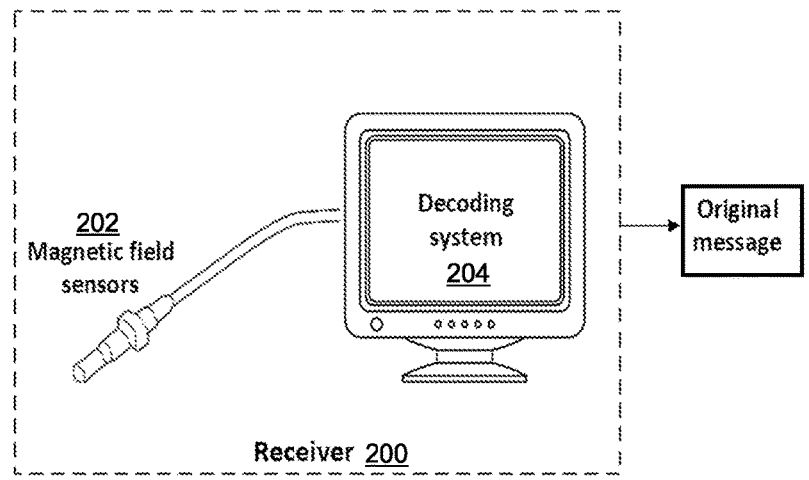
FIG. 2B illustrates a schematic of the transmitted message being received and decoded at a receiver.

Referring to FIG. 2A and FIG. 2B, schematics of the process of sending a message in a method according to the present disclosure are shown, with FIG. 2A showing the transmitter 100 process and FIG. 2B showing the receiver 200 process.

At the transceiver 100 a message to be communicated is received, and is encoded by an encoding system 110 into a pre-defined format. The encoding format must be pre-defined so that a corresponding decoding mechanism can be used at the receiver 200. The Hexadecimal system is the best example of a suitable encoding system because it converts data into character strings of a predictable length that are easily transmitted in 8-bit and 16-bit data packets, however other encoding systems may also be used.

Once an encoded version of the data in the message has been generated, the encoded data is divided into appropriately sized packets (i.e. 8-bit in the illustrated example) and converted to spherical unit vector coordinates in the manner described above. The encoding system thus determines an axis of rotation, or for larger messages a sequence of axes of rotation, for conveying the message data.

A control signal is then sent to the actuators 104 of the electromagnetic system, causing them to rotate the magnet 102 about those axes of rotation by applying appropriate amounts of current/torque, which will generating low frequency electromagnetic waves with a magnetic dipole field indicative of the axis of rotation.

Turning to FIG. 2B, an example configuration of the receiver 200 is shown. The receiver generally consists of a set of magnetic field sensors 202 that are capable of detecting the orientation of a magnetic dipole field of a received EM wave. To achieve this multiple 3-dimensional magnetic field sensors, current loops, or coils are needed.

The received signal is passed to a decoding system 204 which, based on the magnetic dipole field of the received signal, deduces the spherical coordinates of the axes of rotation that the transmitting magnet 102 has cycled through while sending the message, and is thus able to reconstruct the encoded data, i.e. the Hexadecimal character string, from the sequence of inclination and azimuthal angles. This encoded data is then finally decoded to deduce the original message.

FIG. 3 illustrates a data flow of an example message communication transmitted according to the process shown in FIG. 2A.

In a first step, the example text string "Hello World" is converted into a Hexadecimal character string.

In this 8-bit format, each sequential character of the Hexadecimal string can be represented by a single spherical co-ordinate, so in a second step, an azimuthal or inclination angle is calculated for each character in a conversion process.

In a third step, the calculated angles are sent to an axis of rotation generator and merged into sequential unit vectors.

In a fourth step, the unit vectors are in turn converted to a control signal, which determines the current applied to each actuator coil to rotate the magnet about those vectors.

In a fifth step, the actuators are operated according to the control signal, rotating the magnet and generating the desired ELF waves.

FIG. 4A, FIG. 4B, and FIG. 4C illustrate respective portions of the encoded message of FIG. 3.

FIG. 4A represents the first two characters of the hexadecimal string.

FIG. 4B represents the third and fourth characters of the hexadecimal string.

FIG. 4C represents the final two characters of the hexadecimal string.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the method and system for communicating using low frequency EM waves have been described in a specific manner referring to the illustrated embodiments, it is understood that the present invention can be applied to a wide variety of solutions which fit within the scope and spirit of the claims. There are many alternative ways of implementing the invention.

It should be understood that the operations described herein may be carried out by any processor. In particular, the operations may be carried out by, but are not limited to, one or more computing environments used to implement the method such as a data center, a cloud computing environment, a dedicated hosting environment, and/or one or more other computing environments in which one or more assets used by the method re implemented; one or more computing systems or computing entities used to implement the method; one or more virtual assets used to implement the method; one or more supervisory or control systems, such as hypervisors, or other monitoring and management systems, used to monitor and control assets and/or components; one or more communications channels for sending and receiving data used to implement the method; one or more access control systems for limiting access to various components, such as firewalls and gateways; one or more traffic and/or routing systems used to direct, control, and/or buffer, data traffic to components, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the method; one or more databases used to store data; one or more internal or external services used to implement the method; one or more backend systems, such as backend servers or other hardware used to process data and implement the method; one or more software systems used to implement the method; and/or any other assets/components in which the method is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

As used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

Unless specifically stated otherwise, as would be apparent from the above discussion, it is appreciated that throughout the above description, discussions utilizing terms such as, but not limited to, "activating", "accessing", "adding", "applying", "analyzing", "associating", "calculating", "capturing", "classifying", "comparing", "creating", "defining", "detecting", "determining", "eliminating", "extracting", "forwarding", "generating", "identifying", "implementing", "obtaining", "processing", "providing", "receiving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of communication via extremely low or ultra-low frequency electromagnetic waves, the method comprising the steps of:
   (a) at a transmitter:
       receiving message data to be transmitted;
       encoding the message data using a pre-defined encoding method;
       dividing the encoded message data into one or more encoded data packets;
       converting each encoded data packet into a spherical unit vector co-ordinate having an inclination angle and an azimuthal angle within a range representing the encoded data packet; and
       for each encoded data packet, generating a low frequency wave by rotating a magnet or electromagnet, or rotating a magnetic field of a set of electromagnets, about an axis of rotation corresponding to the respective spherical unit vector coordinates for that data packet, the axis of rotation of the magnet or electromagnet, or of the electromagnetic field generated by the set of electromagnets, acting to modulate the magnetic field of the wave; and
   (b) at a receiver:
       receiving the low frequency wave;
       determining the axis of rotation of the magnetic field of the wave for each data packet by analysing a magnetic dipole field of the wave;
       converting the spherical coordinates for the axis of rotation into the encoded data packets; and
       decoding and reconstructing the message data using the pre-defined encoding method.

2. A method of communication according to claim 1, wherein the pre-defined encoding method selected determines the azimuthal and inclination angle ranges associated with respective states representing the encoded data packets.

3. A method of communication according to claim 2, wherein the azimuthal angle ranges and inclination angle ranges are divided into equal portions, each representing an encoded data state.

4. A method of communication according to claim 3, wherein each state represents a respective alphanumeric character, symbol, command, or sequence thereof.

5. A method of communication according to claim 3, wherein the pre-defined encoding system is the Hexadecimal system.

6. A method of communication according to claim 5, wherein each state conveys an 8-bit or 16-bit data packet.

7. A method of communication according to claim 1, wherein the method further comprises carrying out the steps of (a) using multiple rotating magnets to convey multiple data packets in parallel, and wherein the waves from each rotating magnet are received and decoded at the same receiver.

8. A method of communication according to claim 1, wherein the method further comprises controlling the speed of rotation of the magnet or electromagnet to encode the low frequency wave generated with additional information from the message data.

9. A system for carrying out the method of claim 1, the system comprising:

a transmitter comprising:

an encoding module configured to encode received message data, convert the encoded message data into one or more unit vector spherical coordinates, and output a control signal comprising the spherical coordinates;

a low frequency electromagnetic wave generator comprising a magnet or an electromagnet and an actuator arrangement coupled to the encoding module and configured to receive the control signal and rotate the magnet or electromagnet about an axis of rotation corresponding to the spherical coordinates contained in the control signal;

and a receiver comprising:

a magnetic field sensing arrangement configured to detect a low frequency electromagnetic wave and determine the orientation of the magnetic dipole field of the electromagnetic wave;

a decoder module coupled to the magnetic field sensing arrangement and configured to determine one or more spherical coordinates from the orientation of the electromagnetic dipole field, and decode the spherical coordinates into the message data.

10. A system according to claim 9, wherein the magnetic field sensing arrangement of the receiver comprises at least two three-dimensional magnetic field sensors, current loops, or coils.

11. A system according to claim 9, wherein the magnet is a permanent magnet.

12. A system according to claim 9, wherein the magnet is an electromagnet.

13. A system according to claim 9, wherein the magnet is spherical.

14. A system according to claim 9, wherein the magnet is non-spherical and is embedded in a spherical shell.

15. A system according to claim 9, wherein the system comprises multiple pairs of encoding modules and rotating magnets, each being configured to transmit encoded message data to the receiver in parallel, and the receiver comprises multiple corresponding magnetic field sensors, loops, or coils for each transmitting magnet.

16. A system according to claim 9, wherein the actuator arrangement is mechanical, comprising one or more motors mechanically connected to and configured to rotate the magnet and control its axis of rotation.

17. A system according to claim 9, wherein the actuator arrangement is electrical, comprising an air bearing mechanism configured to rotate the magnet.

18. A system according to claim 9, wherein the actuator arrangement is electrical, comprising a magnetic levitation mechanism configured to rotate the magnet.

19. A system according to claim 9, wherein the actuator arrangement is fluidic.

\* \* \* \* \*